United States Patent [19]
Takahashi

[11] Patent Number: 5,889,826
[45] Date of Patent: Mar. 30, 1999

[54] APPARATUS AND METHOD FOR DIVERSITY COMBINING

[75] Inventor: Hideaki Takahashi, Tokyo, Japan

[73] Assignee: NEC Corporation, Tokyo, Japan

[21] Appl. No.: 893,560

[22] Filed: Jul. 11, 1997

[30] Foreign Application Priority Data

Jul. 11, 1996 [JP] Japan .................................. 8-181917

[51] Int. Cl.[6] .................................................. H04B 7/08
[52] U.S. Cl. ........................... 315/347; 455/132; 455/137
[58] Field of Search .................................. 375/347, 267, 375/329, 331; 455/132, 137

[56] References Cited

U.S. PATENT DOCUMENTS

| | | | |
|---|---|---|---|
| 5,461,646 | 10/1995 | Anvari | 375/347 |
| 5,465,271 | 11/1995 | Hladik et al. | 375/347 |
| 5,761,252 | 6/1998 | Inuma | 375/347 |

FOREIGN PATENT DOCUMENTS

| | | |
|---|---|---|
| 0 683 571 A2 | 11/1995 | European Pat. Off. . |
| 6-97920 | 4/1994 | Japan . |
| 7-50627 | 2/1995 | Japan . |
| 7-307724 | 11/1995 | Japan . |

*Primary Examiner*—Temesghen Ghebretinsae
*Attorney, Agent, or Firm*—Foley & Lardner

[57] ABSTRACT

A diversity combiner includes a plurality of branch receiving sections each receiving a QPSK modulation signal and a vector combiner. Each of the branch receiving sections includes a level detector which detects a signal level from the QPSK modulation signal, a phase difference detector which detects a phase difference from the QPSK modulation signal in each bit interval, and a data transformer which transforms polar data consisting of the signal level and the phase difference into rectangular data consisting of two rectangular coordinate values. The rectangular data obtained by the each branch receiving sections is combined by the vector combiner to produce combined rectangular data which is in turn transformed to combined polar data.

15 Claims, 9 Drawing Sheets

APPARATUS AND METHOD FOR DIVERSITY COMBINING

BACKGROUND OF THE INVENTION

1. Field of the Invention

The present invention generally relates to diversity techniques for reception of diversity signals in a radio receiver, and in particular to a diversity combining method and system where diversity branches are weighted prior to summing them.

2. Description of the Related Art

In general, branch selection diversity and diversity combining are available for reception of diversity signals. With the branch selection diversity, one signal is chosen from the set of diversity branches based on received signal strength. On the other hand, with the diversity combining, especially maximal-ratio combining, the diversity branches are weighted prior to summing them, each weight being proportional to the received branch signal amplitude. In digital mobile communications system such as cellular or cordless telephone systems, there is an increasing tendency to employ the diversity combining technique to provide improved quality of communication services and a wider service area.

There has been proposed a first conventional diversity combiner which is provided with analog-to-digital (A-D) converters for converting the intermediate-frequency (IF) diversity signals to digital diversity signals, respectively. After the respective digital signals are stored onto registers, the stored signals are read in phase with each other to be combined and decoded.

A second conventional diversity combiner has been proposed in Japanese Patent Unexamined Publication No. 7-307724. According to this diversity combining method, for each of the diversity branches, sampled phase data in symbols and a received signal strength indicator (RSSI) level are used to obtain a vector in the I-Q rectangular coordinate system. And the respective obtained vectors for the diversity branches are combined into an output signal. More specifically, the diversity combiner is provided with a first memory for the I component and a second memory for the Q component. The first memory is used to obtain the I component: $(RSSI)^2 \cos(\theta)$, and the second memory is used to obtain the Q component: $(RSSI)^2 \sin(\theta)$, where $\theta$ is the sampled phase data.

There are other related documents: Japanese Patent Unexamined Publication Nos. 6-97920 and 7-50627. In the former, by separately detecting a phase modulation component and an amplitude modulation component from each diversity branch signal, a limiter amplifier can be used for the phase modulation detection and further a variation of an received signal strength can be detected from the amplitude modulation component. In the latter, to correct phase variations among branches in N-PSK signal detection, a signal of a first branch is phase-shifted by $2\pi k/N$ ($k=0, 1, \ldots, N-1$) with reference to a second branch for each symbol timing to produce N signals. Assuming that the amount of phase variation between two consecutive symbols for each branch is not varied, a signal having the minimum distance of signal points between two consecutive symbols is selected from the N signals, and the selected signal is assumed to be in phase with the first branch.

In the first conventional combiner, however, it is necessary to use a sample clock whose frequency is sufficiently higher than the symbol rate (at least eight times the symbol rate) to adjust the phase with precision. In the case of the digital cellular telephone system having a transmission rate of 42 Kbps, a sample clock of at least 168 KHz is needed. In the case of digital cordless telephone system having a transmission rate of 384 Kbps, a higher sample clock of 1.536 MHz is needed. Therefore, the first conventional system needs expensive A-D converters or a digital signal processor (DSP), especially in the case of high bit-rate system.

In the second conventional combiner, the larger the phase and RSSI resolution, the larger the amount of memory needed in the first and second memories. Assuming 8-bit phase angle data, 8-bit RSSI data, and 8-bit data in rectangular coordinates, there are needed two random access memories (RAMs) each having a capacity of 65,536 words×8 bits. To reduce error, increased precision of data in bits is needed, resulting in a larger amount of memory. Such a large amount of memory cannot be built in a single gate array. Therefore, external circuitry is required.

SUMMARY OF THE INVENTION

An object of the present invention is to provide a diversity combiner and method which can achieve precise diversity combining with simple calculations.

Another object of the present invention is to provide a diversity combiner and method which can achieve precise diversity combining without the need of a precise A-D converter or DSP, thereby allowing its circuit to be incorporated in a single gate array circuit.

According to the present invention, polar phase difference data is transformed into rectangular phase difference data and then weighted rectangular phase difference data is obtained in each diversity branch. Subsequently, the weighted rectangular phase difference data is combined for all the diversity branches.

In a plurality of branch receiving sections each receiving a QPSK (quadrature phase shift keying) modulation signal, each of the branch receiving sections includes a level detector for detecting a signal level from the QPSK modulation signal; a phase difference detector for detecting a phase difference from the QPSK modulation signal in each bit interval; and a data transformer for transforming polar data consisting of the signal level and the phase difference into rectangular data consisting of two rectangular coordinate values. The rectangular data obtained by the each branch receiving sections is combined by a vector combiner to produce combined rectangular data.

The level detector may include a received signal level detector for detecting a received signal strength from the QPSK modulation signal and a data converter for converting the received signal strength to the signal level referring to a predetermined conversion table containing the received signal strength and the signal level.

DETAILED DESCRIPTION OF THE PREFERRED EMBODIMENTS

Figure 1:
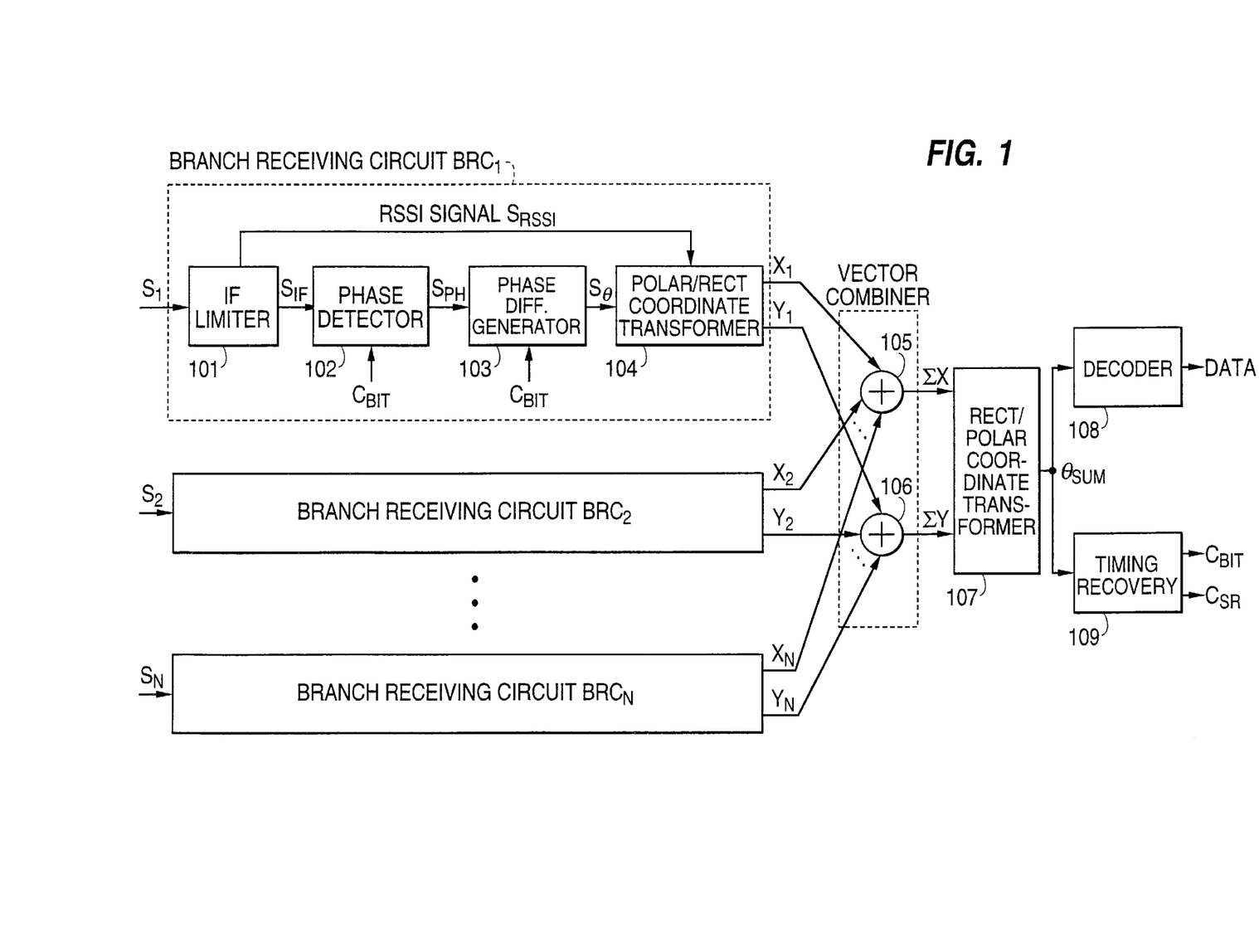
FIG. 1 is a block diagram showing a diversity combining system according to an embodiment of the present invention.

Referring to FIG. 1, there is shown a diversity combiner according to an embodiment of the present invention which is provided with N branch receiving circuits $BRC_1$–$BRC_N$ (N is an integer) corresponding to diversity branches, respectively. Each branch receiving circuit $BRC_1$ is comprised of an IF limiter 101, a phase detector 102, a phase difference generator 103, and a polar-to-rectangular coordinate transformer 104. The IF limiter 101 of the branch receiving circuits $BRC_1$ receives a diversity branch signal $S_1$ which is here a QPSK (quadrature phase-shift keying) modulation signal and generates a limited IF signal $S_{IF1}$ and an RSSI signal $S_{RSSI i}$. The phase detector 102 detects instant phase data $S_{PHi}$ from the limited IF signal $S_{IFi}$ according to a bit-rate clock $C_{BIT}$ and outputs it to the phase difference generator 103. The phase difference generator 103 generates phase difference data $S_\theta$ from the instant phase data $S_{PHi}$ according to the bit-rate clock $C_{BIT}$. The polar-to-rectangular coordinate transformer 104 transforms polar data ($S_{RSSIi}$, $S_{\theta i}$) to rectangular data ($X_i$, $Y_i$) which is output as a phase difference vector of the diversity branch signal $S_1$ to a vector combiner comprising an X adder 105 and a Y adder 106.

In this manner, the X and Y components of the phase difference vectors, ($X_1$, $Y_1$), ($X_2$, $Y_2$), . . . , ($X_N$, $Y_N$), are generated by the branch receiving circuits $BRC_1$–$BRC_N$, respectively, and they are combined by the X adder 105 and the Y adder 106 to produce X combined component $\Sigma X$ and Y combined component $\Sigma Y$, respectively. The X and Y combined components $\Sigma X$ and $\Sigma Y$ are output to a rectangular-to-polar coordinate transformer 107 where they are transformed to combined polar data $\theta_{SUM}$. The combined polar data $\theta_{SUM}$ is output to a decoder 108 and a timing recovery circuit 109. The decoder 108 decodes the combined polar data $\theta_{SUM}$ into received data and the timing recovery circuit 109 reproduces a bit-rate clock CBIT and a symbol-rate clock $C_{SR}$ from the combined polar data $\theta_{SUM}$.

The IF limiter 101 performs the amplitude limit and the RSSI detection. Such an IF limiter is commercially available as an integrated circuit comprising a combination of a logarithmic amplifier and a linear amplifier.

Figure 2:
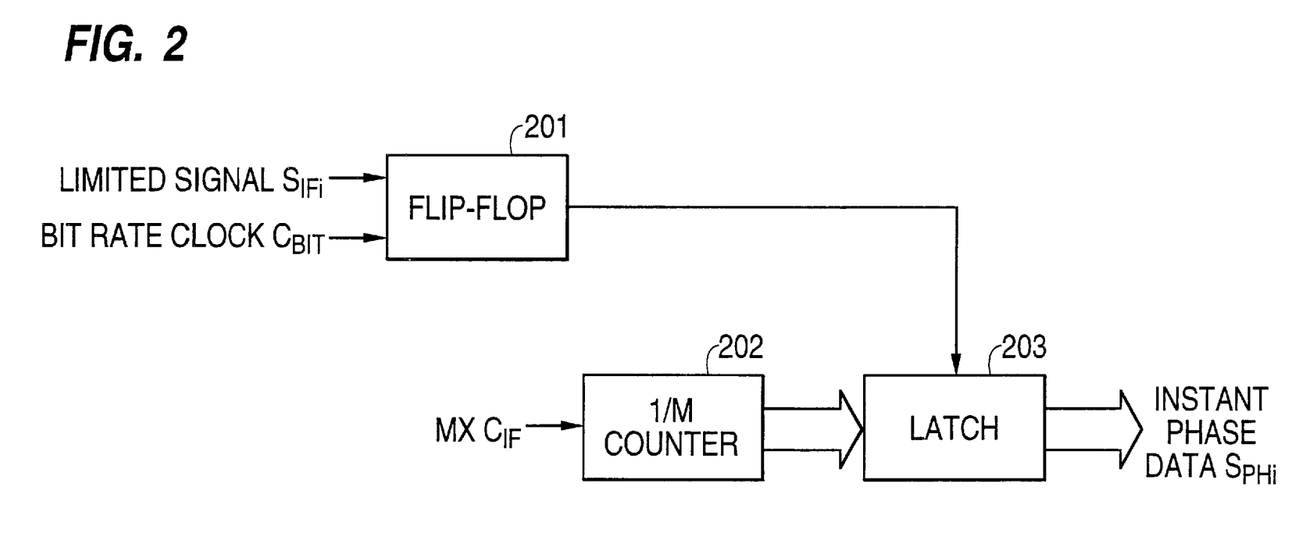
FIG. 2 is a diagram showing a phase detector in the embodiment as shown in FIG. 1.

Referring to FIG. 2, the phase detector 102 is comprised of a flip-flop 201, 1/M counter 202, and a latch 203. The flip-flop 201 inputs the limited IF signal $S_{IFi}$ from the IF limiter 101 according to the bit-rate clock $C_{BIT}$ and outputs it as a latch timing signal to the latch 203. The 1/M counter 202 increments by one according to a clock having M times the frequency $C_{IF}$ of the IF clock signal. An instant count value of the 1/M counter 202 is latched onto the latch 203 when the flip-flop 201 outputs the latch timing signal. The latched instant count value is output as the instant phase data $S_{PHi}$ to the phase difference generator 103. The details of the phase detection will be described referring to FIG. 3.

Figure 3:
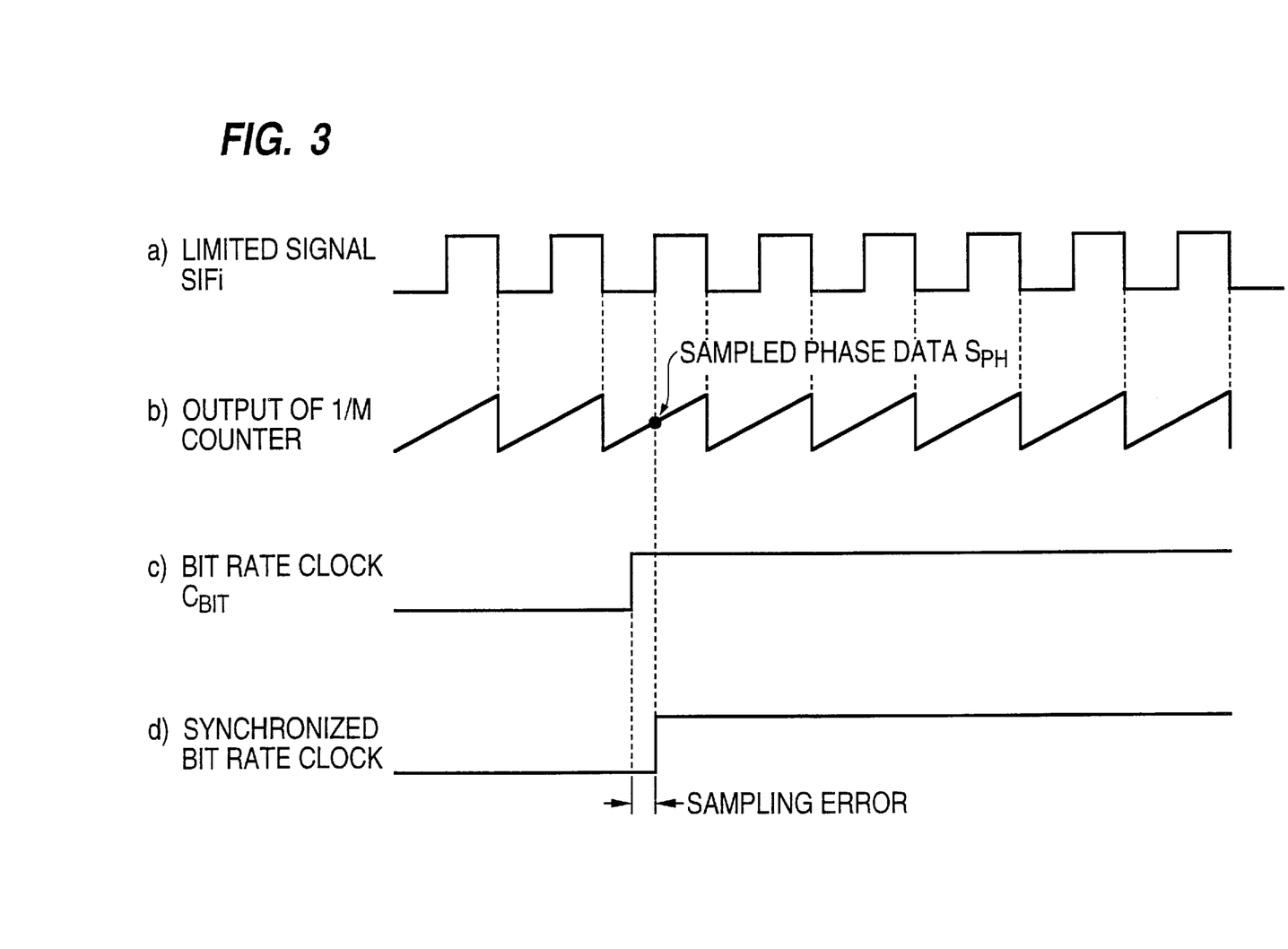
FIG. 3 is a diagram showing a phase detection operation of the phase detector of FIG. 2.

As shown in FIG. 3, the limited signal $S_{IFi}$ varies in amplitude at a predetermined frequency as shown in FIG. 3(a). Therefore, the output count value of the 1/M counter 202 increments while it is reset upon the trailing edge of the limited IF signal $S_{IF1}$ as shown in FIG. 3(b). The sampled or instant phase data $S_{PH1}$ of the limited signal $S_{IF1}$ is latched onto the latch 203 when the output of the flip-flop 201 goes high just after the bit-rate clock $C_{BIT}$ goes high. In other words, the instant phase data $S_{PHi}$ is obtained by sampling the count value when the amplitude of the limited signal $S_{IFi}$ crosses the zero level just after the bit-rate clock $C_{BIT}$ goes high. It is found from the FIG. 3(a) and (b) that the instant phase data $S_{PHi}$ is converted to degree data by 360(degrees) /M×$S_{PHi}$.

Figure 4:
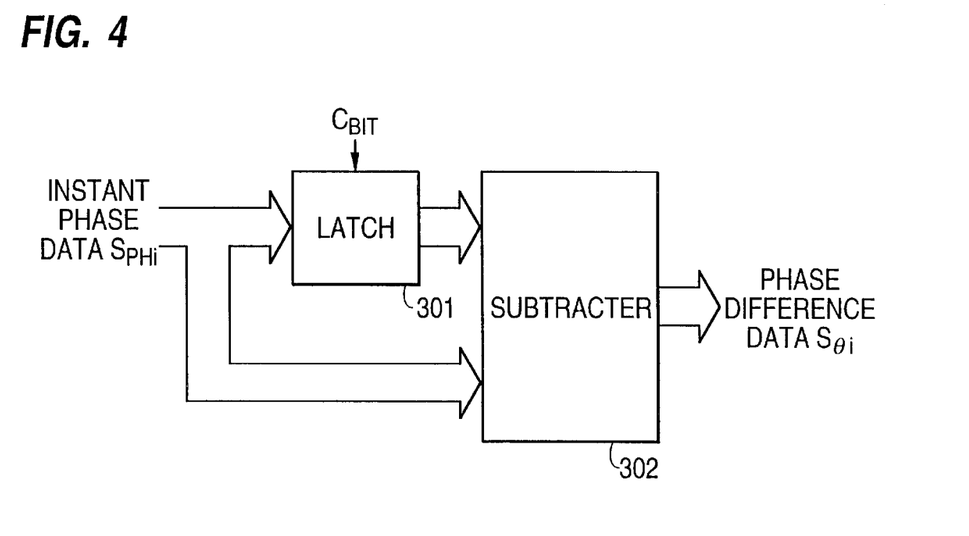
FIG. 4 is a block diagram showing a phase difference generator in the embodiment as shown in FIG. 1.

Referring to FIG. 4, the phase difference generator 103 is comprised of a latch 301 and a subtracter 302. The latch 301 latches the instant phase data $S_{PHi}$ according to the bit-rate clock $C_{BIT}$ to output the delayed phase data $S_{PHi}$ which was received one bit earlier to the subtracter 302. The subtracter 302 performs subtraction of the present phase data and the delayed phase data to produce the phase difference data $S_{\theta i}$.

Figure 5:
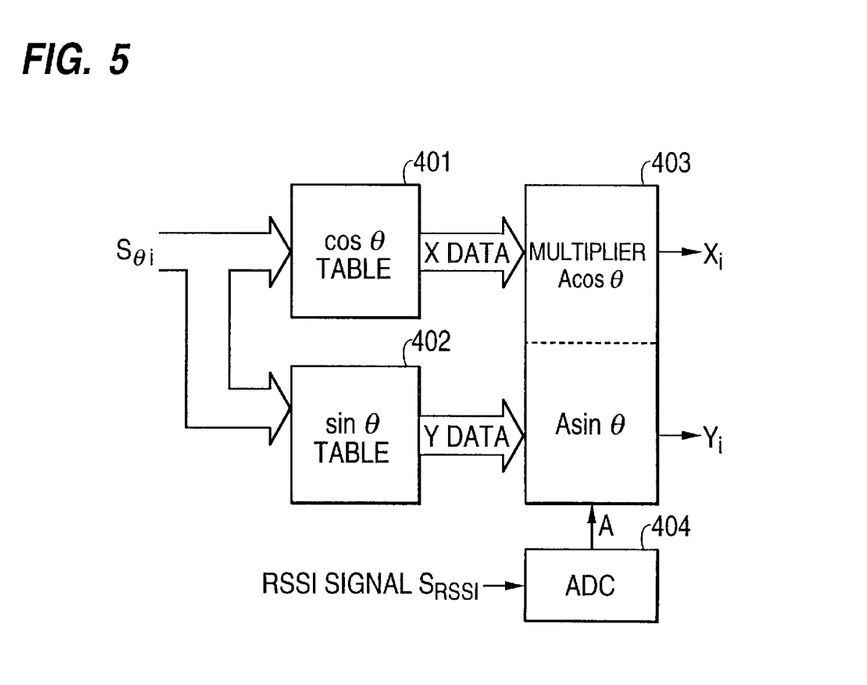
FIG. 5 is a block diagram showing a polar/rectangular coordinate transformer in the embodiment as shown in FIG. 1.

Referring to FIG. 5, the polar-to-rectangular coordinate transformer 104 is comprised of a cos θ table 401, a sin θ table 402, a multiplier 403, and an A-D converter 404. The cos θ table 401 and the sin θ table 402 receives the phase difference data $S_{\theta i}$ from the phase difference generator 103 and generate X data and Y data in the rectangular coordinates. The cosθ table 401 and the sin θ table 402 are implemented with RAMs storing cos θ and sin θ corresponding to each value of θ or $S_0$. Therefore, when provided with the value of θ or $S_0$ as address, the corresponding cos θ and sin θ are uniquely obtained.

Since the value of $θ_i$ is calculated as follows:

360(degrees)/M×$S_{\theta i}$ (see FIGS. 2 and 3).

each of the cos θ table 401 and the sin θ table 402 stores only M data pieces. In the case of M=32 and 8-bit data representing cos $θ_1$ and sin $θ_1$, only two RAMs each having a capacity of 32 words×8 bits are needed for each diversity branch. Compared with the second conventional system as described before (Japanese Patent Unexamined Publication No. 7-307724), the embodiment can improve the precision of polar-to-rectangular coordinate transformation by 10 bits or more.

The A-D converter 404 converts the RSSI signal $S_{RSSIi}$ to digital amplitude data A which is used by the multiplier 403 receiving the X and Y data (cos $θ_1$, sin $θ_1$) from the cos θ table 401 and the sin θ table 402. The multiplier 403 multiplies each of cos $θ_i$ and sin $θ_i$ by the digital amplitude data $A_i$ to produce ($X_1$, $Y_i$)=($A_i$ cos$θ_i$, $A_i$ and sin $θ_i$). In this manner, the X and Y components ($X_1$, $Y_1$), ($X_2$, $Y_2$), . . . , ($X_N$, $Y_N$), are generated by the branch receiving circuits $BRC_1$–$BRC_N$, respectively, and they are combined by the X adder 105 and the Y adder 106, respectively.

Figure 6:
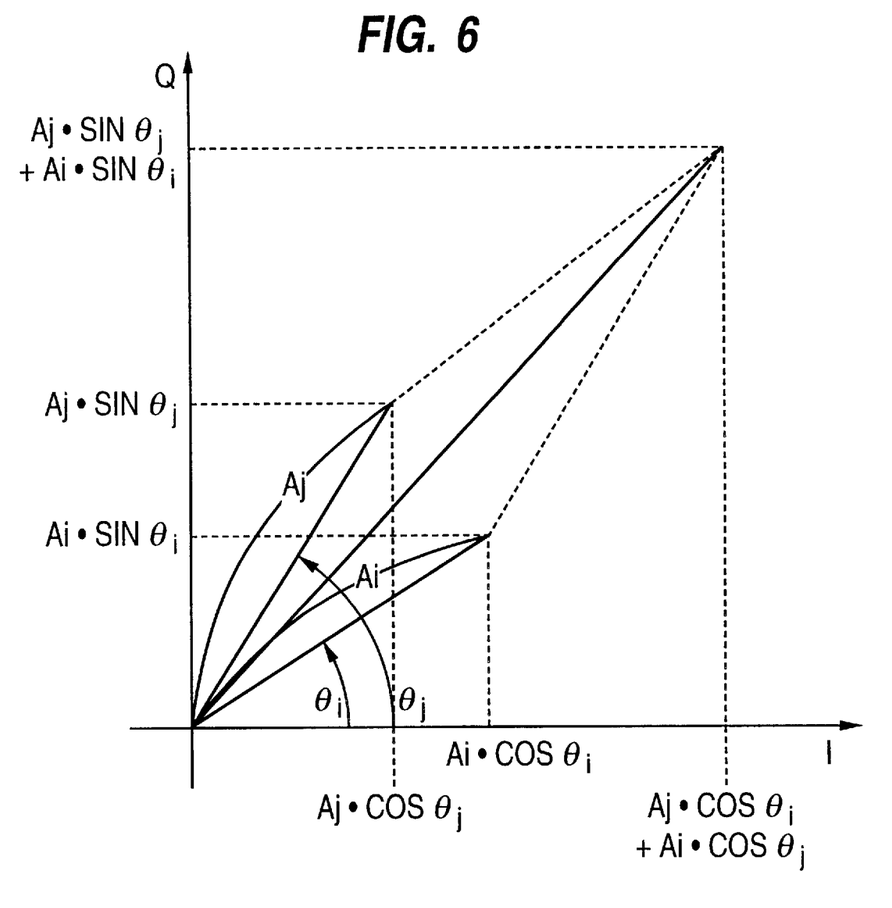
FIG. 6 is a diagram showing an example of vector combining of a vector combiner in the embodiment of FIG. 1.

Referring to FIG. 6, two polar data ($A_i$, $θ_i$) and ($A_j$, $θ_j$) are combined by the X adder 105 and the Y adder 106 in the I-Q rectangular coordinates. The X adder 105 performs the following calculation:

$A_1$ cos $θ_i$+$A_j$ cos $θ_j$=$\Sigma A$ cos θ.

The Y adder 106 performs the following calculation:

$A_i$ sin $θ_i$+$A_j$ sin $θ_j$=$\Sigma A$ sin θ.

In this manner, the combined rectangular data ($\Sigma X$, $\Sigma Y$)= ($\Sigma A$ cos θ, $\Sigma A$ sin θ) is obtained by the vector combiner.

The rectangular-to-polar coordinate transformer 107 transforms the combined rectangular data ($\Sigma A$ cos θ, $\Sigma A$ sin θ) to the corresponding combined polar data $θ_{SUM}$ which indicates combined phase difference data.

The combined polar data $θ_{SUM}$ is, however, phase difference data which was obtained by the phase detector 102 and the phase difference generator 103 according to bit-rate clock $C_{BIT}$. Therefore, it is necessary to produce the phase difference between symbols from the combined polar data $θ_{SUM}$.

Figure 7:
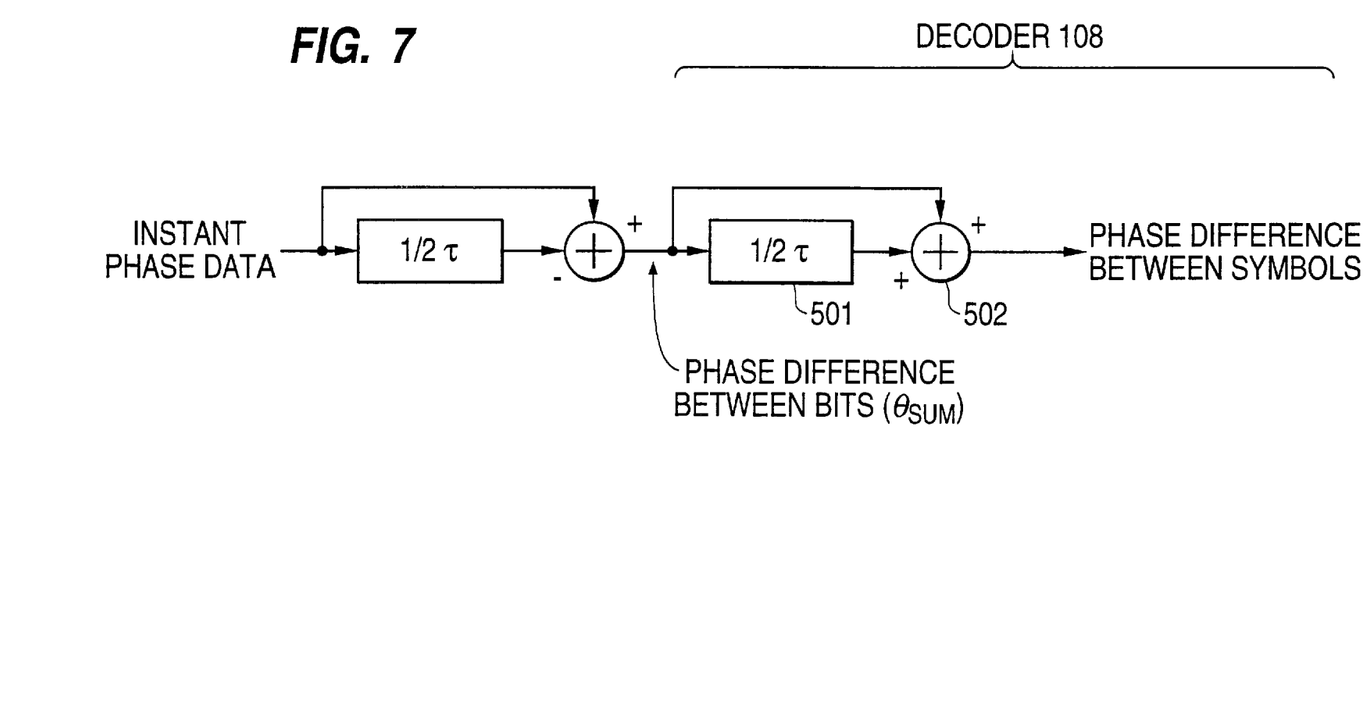
FIG. 7 is a diagram showing a functional configuration of a decoder in the embodiment as shown in FIG. 1.

Referring to FIG. 7, the decoder 108 produces the phase difference between symbols from the interbit phase difference data $θ_{SUM}$. More specifically, a combination of a delay section 501 of ½τ (τ is a symbol duration) and an adder 502 adds the present phase difference data $\theta_{SUM(t)}$ to the delayed phase difference data $\theta_{SUM(t-1)}$ to produce the intersymbol phase difference data which is used to decode received data.

Figure 8:
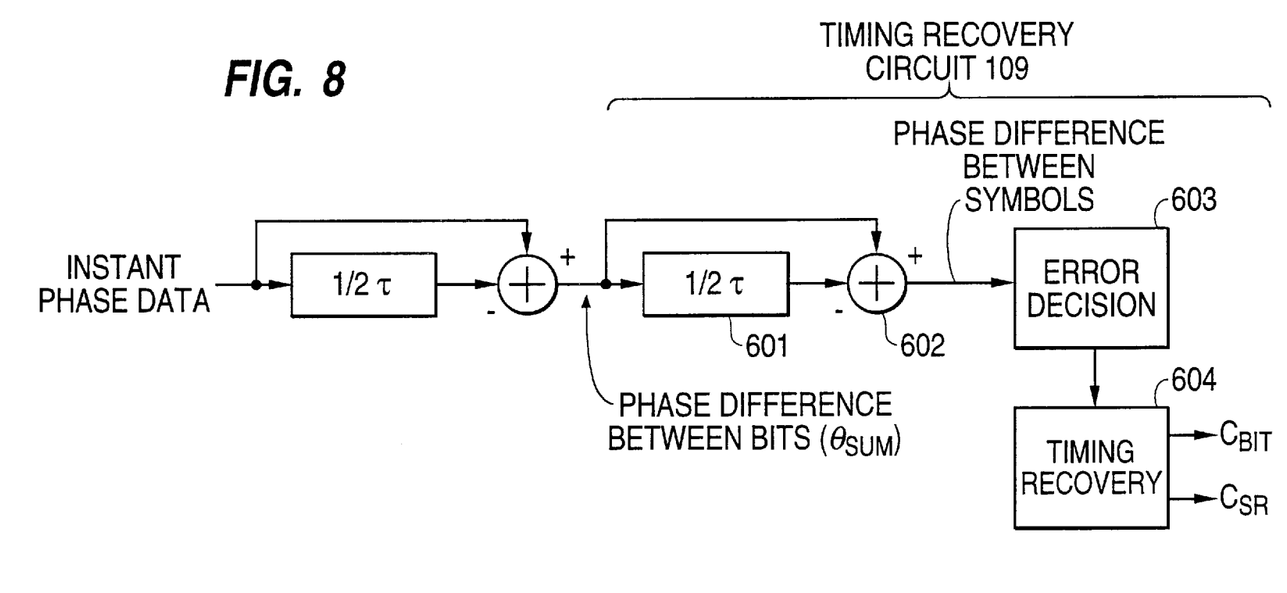
FIG. 8 is a diagram showing a functional configuration of a timing recovery section in the embodiment as shown in FIG. 1.

Referring to FIG. 8, the timing recovery circuit 109 produces the phase difference between symbols from the interbit phase difference data $\theta_{SUM}$. More specifically, a combination of a delay section 601 of ½τ and an adder 602 subtracts the delayed phase difference data $\theta_{SUM(t-1)}$ from the present phase difference data $\theta_{SUM(t)}$ to produce the intersymbol phase difference data which is output to an error decision section 603.

Figure 9:
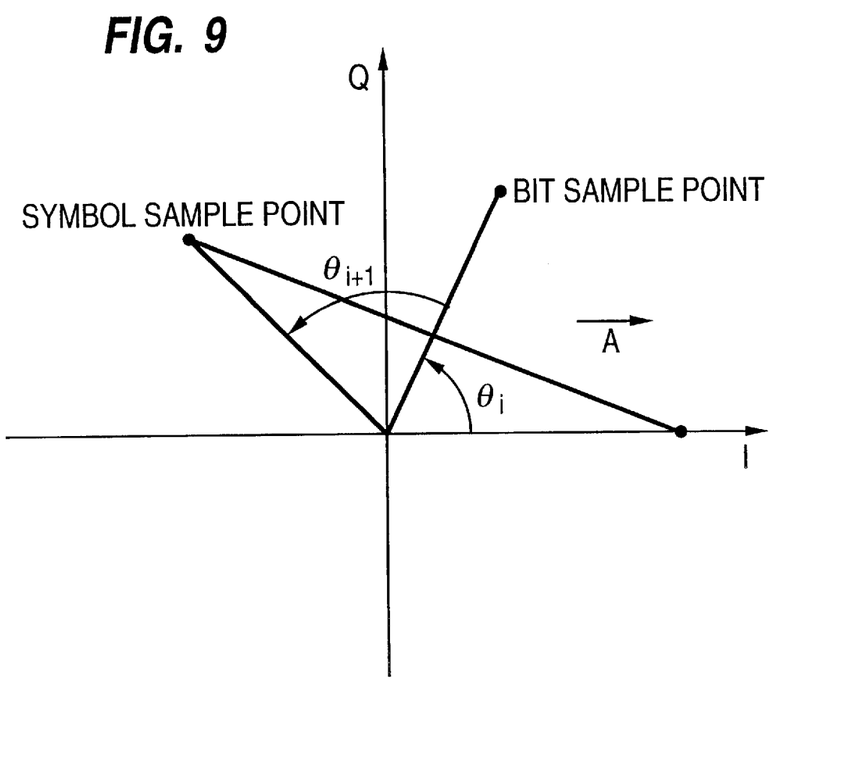
FIG. 9 is a diagram showing a principle of timing recovery in the timing recovery section of FIG. 8.

As shown in FIG. 9, in the case of QPSK modulation scheme, the first phase difference obtained by sampling in the first half of a symbol duration is identical to the second phase difference obtained by sampling in the second half of the same symbol duration when the sampling is performed at a normal bit sample point over the symbol duration. Such a property can be used to reproduce the clock timing. More specifically, the error decision section 603 detects the difference between the first and second phase differences, and then a timing recovery section 604 performs the clock recovery by controlling the clock so that the first phase difference becomes coincident with the second phase difference to produce the bit-rate clock $C_{BIT}$ and the symbol-rate clock $C_{BR}$.

Figure 10:
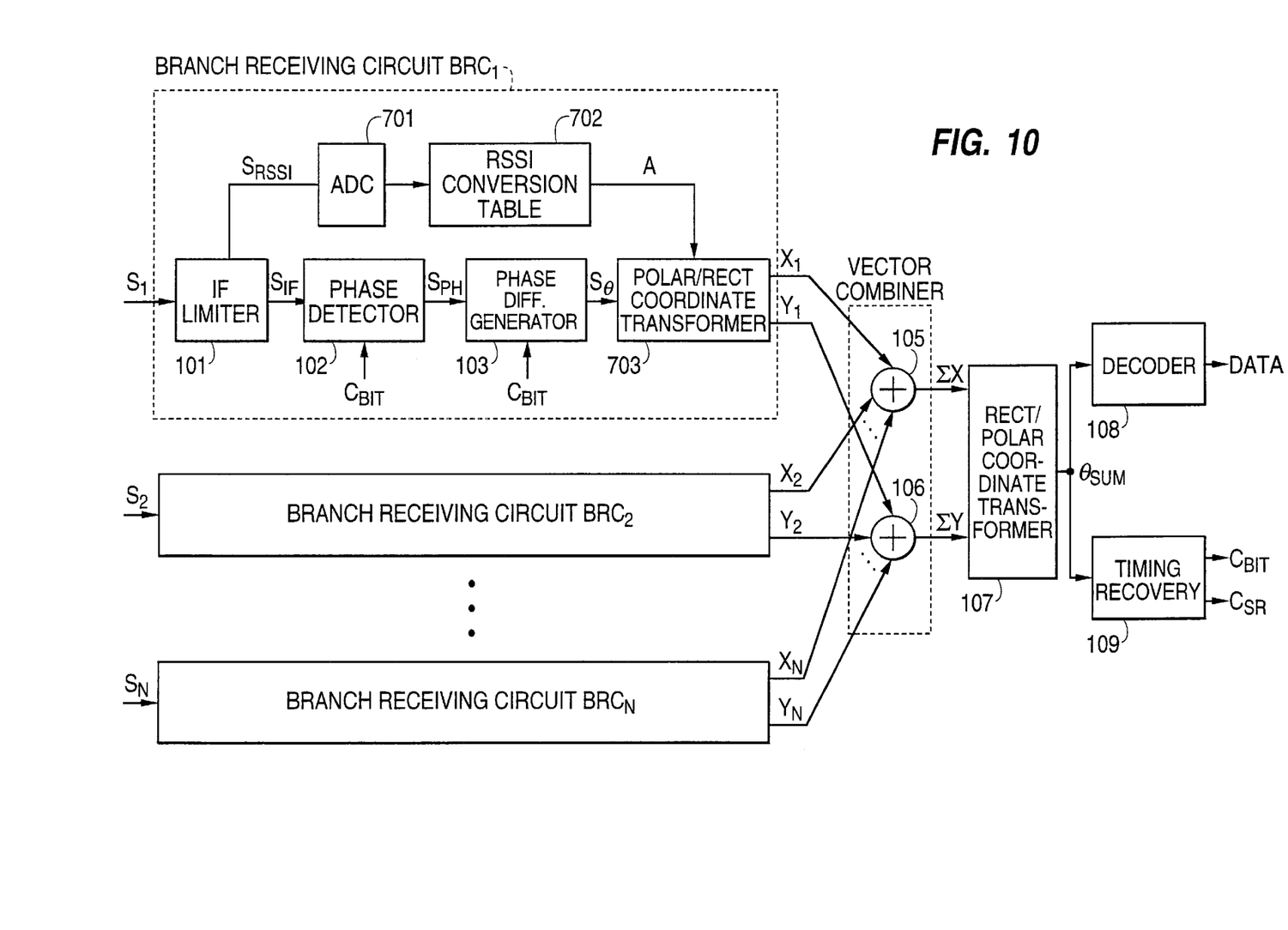
FIG. 10 is a block diagram showing a diversity combining system according to another embodiment of the present invention.

Referring to FIG. 10, where functional blocks similar to those previously described with reference to FIG. 1 are denoted by the same reference numerals, there is shown a diversity combiner according to another embodiment of the present invention. For simplicity, the descriptions of the same blocks denoted by the same reference numerals are omitted.

According to this embodiment, the RSSI signal $S_{RSSI}$ from the IF limiter 101 is converted to a digital RSSI data by an A-D converter 701. The digital RSSI data is output to a RSSI conversion table 702 which is implemented with RAM storing RSSI conversion data. Upon receipt of the digital RSSI data as address data, the RSSI conversion table 702 reads the corresponding digital amplitude data A and outputs it to the polar-to-rectangular coordinate transformer 703. The polar-to-rectangular coordinate transformer 703 has the same circuit configuration as shown in FIG. 5 except that the A-D converter 404 is not needed. Since desired RSSI conversion data can be stored in the RSSI conversion table 702, desired process of the digital RSSI data is allowed.

Conventionally, the balance adjustment of RSSI for each diversity branch is performed with a trimmer capacitor and a variable resistor. According to the embodiment, however, the RSSI conversion data corresponding to possible RSSI values are previously stored in the RAM 702, and the corresponding RSSI conversion data is uniquely read from the RAM 702 depending on the received digital RSSI data, resulting in dramatically reduced time required for balance check and adjustment.

Another advantage of the present embodiment is to allow an arbitrary weighted combining calculation by only storing desired conversion data. For example, in the case of the RAM storing square conversion data, a received RSSI value is squared and output as the digital amplitude data A to the polar-to-rectangular coordinate transformer 703. Therefore, the square weighted rectangular data $(X_1, Y_1)=(A_i \cos \theta_i, A_1 \sin\theta_1)$ is produced and then the square weighted vector combining is performed by the X and Y adders 105 and 106, as described before.

What is claimed is:

1. A diversity combiner comprising:
a plurality of branch receiving sections each receiving a QPSK (quadrature phase shift keying) modulation signal, each of the branch receiving sections comprising:
a level detector for detecting a signal level from the QPSK modulation signal;
a phase difference detector for detecting a phase difference from the QPSK modulation signal in each bit interval;
a data transformer for transforming polar data consisting of the signal level and the phase difference into rectangular data consisting of two rectangular coordinate values; and
a vector combiner for combining the rectangular data for the branch receiving sections to produce combined rectangular data;
wherein said level detector comprises:
a received signal level detector for detecting a received signal strength from the QPSK modulation signal; and
a data converter for converting the received signal strength to the signal level referring to a predetermined conversion table containing the received signal strength and the signal level.

2. The diversity combiner according to claim 1, wherein the data converter is a memory which previously stores the predetermined conversion table, the memory receiving the received signal strength as address data and producing the signal level corresponding to the received signal strength.

3. The diversity combiner according to claim 1, wherein the data transformer comprises:
a first converter for converting the phase difference of the polar data to a first rectangular coordinate value based on a cosine data table;
a second converter for converting the phase difference of the polar data to a second rectangular coordinate value based on a sine data table; and
a multiplier for multiplying each of the first and second rectangular coordinate values by the signal level of the polar data to produce the rectangular data.

4. The diversity combiner according to claim 1, wherein said data transformer comprises:
a first converter for converting the phase difference of the polar data to a first rectangular coordinate value based on a cosine data table;
a second converter for converting the phase difference of the polar data to a second rectangular coordinate value based on a sine data table; and
multiplier for multiplying each of the first and second rectangular coordinate values by the signal level of the polar data to produce the rectangular data.

5. A radio receiver having a plurality of diversity branches, comprising:
a branch receiving section for receiving a QPSK (quadrature phase shift keying) modulation signal, the branch receiving section being provided for each of the diversity branches, the branch receiving section comprising:
a level detector for detecting a signal level from the QPSK modulation signal;
a phase detector for detecting a phase of the QPSK modulation signal in each bit interval;
a phase difference generator for generating a phase difference between a first phase at a bit interval and a second phase at a following bit interval; and
a first data transformer for transforming polar phase difference data consisting of the signal level and the phase difference into rectangular phase difference data consisting of two rectangular coordinate values weighted by the signal level;
a vector combiner for combining the rectangular phase difference data for the diversity branches to produce combined rectangular phase difference data;

a second data transformer for transforming the combined rectangular phase difference data into combined polar phase difference data;

a decoder for decoding received data from the combined polar phase difference data; and a clock recovery section for recovering timing clocks from the combined polar phase difference data.

6. The radio receiver according to claim 5, wherein the first data transformer comprises:

a first converter for converting the phase difference of the polar phase difference data to a first rectangular coordinate value based on a cosine data table;

a second converter for converting the phase difference of the polar phase difference data to a second rectangular coordinate value based on a sine data table; and a multiplier for multiplying each of the first and second rectangular coordinate values by the signal level of the polar data to produce the rectangular phase difference data.

7. The radio receiver according to claim 5, wherein the level detector comprises:

a received signal level detector for detecting a received signal strength from the QPSK modulation signal; and a data converter for converting the received signal strength to the signal level referring to a predetermined conversion table containing the received signal strength and the signal level.

8. The radio receiver according to claim 7, wherein the data converter is a memory which previously stores the predetermined conversion table, the memory receiving the received signal strength as address data and producing the signal level corresponding to the received signal strength.

9. The radio receiver according to claim 7, wherein the first data transformer comprises:

a first converter for converting the phase difference of the polar phase difference data to a first rectangular coordinate value based on a cosine data table;

a second converter for converting the phase difference of the polar phase difference data to a second rectangular coordinate value based on a sine data table; and a multiplier for multiplying each of the first and second rectangular coordinate values by the signal level of the polar data to produce the rectangular phase difference data.

10. The radio receiver according to claim 5, wherein the branch receiving section receives an intermediate-frequency (IF) QPSK modulation signal, wherein the level detector comprises a limiter for limiting an amplitude of an intermediate-frequency (IF) QPSK modulation signal to a predetermined level and detecting the signal level from the IF QPSK modulation signal.

11. The radio receiver according to claim 5, wherein the decoder decodes the received data from data obtained by adding combined polar phase difference data to ½-symbol-delayed combined polar phase difference data, and the clock recovery section recovers the timing clocks from data obtained by subtracting the ½-symbol-delayed combined polar phase difference data from the combined polar phase difference data.

12. A diversity combining method for a plurality of branch receiving sections each receiving a QPSK (quadrature phase shift keying) modulation signal, comprising the steps of:

at each of the branch receiving sections, a) detecting a signal level from the QPSK modulation signal;

b) detecting a phase difference from the QPSK modulation signal in each bit interval;

c) transforming polar data consisting of the signal level and the phase difference into rectangular data consisting of a first rectangular coordinate value and a second rectangular coordinate value; and combining the rectangular data for all the branch receiving sections by adding the first and second rectangular coordinate values, respectively, to produce combined rectangular data, wherein the step a) comprises the steps of:

detecting a received signal strength from the QPSK modulation signal; and converting the received signal strength to the signal level referring to a predetermined conversion table containing the received signal strength and the signal level.

13. The diversity combining method according to claim 12, wherein the step c) comprises the steps of:

converting the phase difference of the polar data to a first rectangular coordinate value based on a cosine data table;

converting the phase difference of the polar data to a second rectangular coordinate value based on a sine data table; and multiplying each of the first and second rectangular coordinate values by the signal level of the polar data to produce the rectangular data.

14. The diversity combining method according to claim 12, wherein the step c) comprises the steps of:

converting the phase difference of the polar data to a first rectangular coordinate value based on a cosine data table;

converting the phase difference of the polar data to a second rectangular coordinate value based on a sine data table; and multiplying each of the first and second rectangular coordinate values by the signal level of the polar data to produce the rectangular data.

15. A receiving method for a radio receiver which is provided with a plurality of branch receiving sections each corresponding to a diversity branch, comprising the steps of:

at each of the branch receiving sections, detecting a signal level from a QPSK (quadrature phase shift keying) modulation signal;

detecting a phase of the QPSK modulation signal in each bit interval;

generating a phase difference between a first phase at a bit interval and a second phase at a following bit interval; and transforming polar phase difference data consisting of the signal level and the phase difference into rectangular phase difference data consisting of two rectangular coordinate values weighted by the signal level;

combining the rectangular phase difference data for the branch receiving sections to produce combined rectangular phase difference data;

transforming the combined rectangular phase difference data into combined polar phase difference data;

decoding received data from the combined polar phase difference data; and recovering timing clocks from the combined polar phase difference data.

* * * * *